United States Patent [19]

Dagenais

[11] Patent Number: 4,787,171
[45] Date of Patent: Nov. 29, 1988

[54] INSECT SWATTER

[76] Inventor: Pierre Dagenais, 6024 Waverly Street, Montreal, Canada, H2T 2Y3

[21] Appl. No.: 56,248

[22] Filed: Jun. 1, 1987

[51] Int. Cl.⁴ ............................................. A01M 3/02
[52] U.S. Cl. ..................................................... 43/137
[58] Field of Search ......................... 43/137, 136, 114

[56] References Cited

U.S. PATENT DOCUMENTS

| | | | |
|---|---|---|---|
| 1,299,580 | 4/1919 | Krumlaw | 43/137 |
| 2,437,447 | 3/1948 | Tarbell | 43/136 |
| 2,604,723 | 7/1952 | Bennett | 43/137 |
| 2,618,882 | 11/1952 | Martin | 43/137 |
| 3,449,856 | 6/1969 | Weaver | 43/136 |
| 3,673,730 | 7/1972 | Hegenberger | 43/137 |
| 4,126,959 | 11/1978 | Graham | 43/136 |
| 4,653,222 | 3/1987 | Viscosi | 43/137 |

FOREIGN PATENT DOCUMENTS

| | | |
|---|---|---|
| 8757 | 5/1906 | Canada . |
| 15767 | 9/1914 | Canada . |
| 34143 | 5/1934 | Canada . |

Primary Examiner—Gene P. Crosby

[57] ABSTRACT

An insect swatter designed to prevent soiling of walls and the like flat surfaces, in which an insect is caught without being crushed. The swatter comprises a cup-shaped body with an exposed insect-catching glue layer lining the inside. The swatter has an upwardly-convex semi-flexible membrane peripherally supported by a frame ring, the latter connected to a handle. A glue-coated sheet is secured to the inside face of the semi-flexible membrane. During a strike around the bug, the inertia momentum gained by the semi-flexible membrane briefly shifts the convexity thereof to a concavity, whereby the bug touches and adheres to the glue without being crushed. The glue-coated sheet can be easily removed after use and replaced by a new sheet.

10 Claims, 2 Drawing Sheets

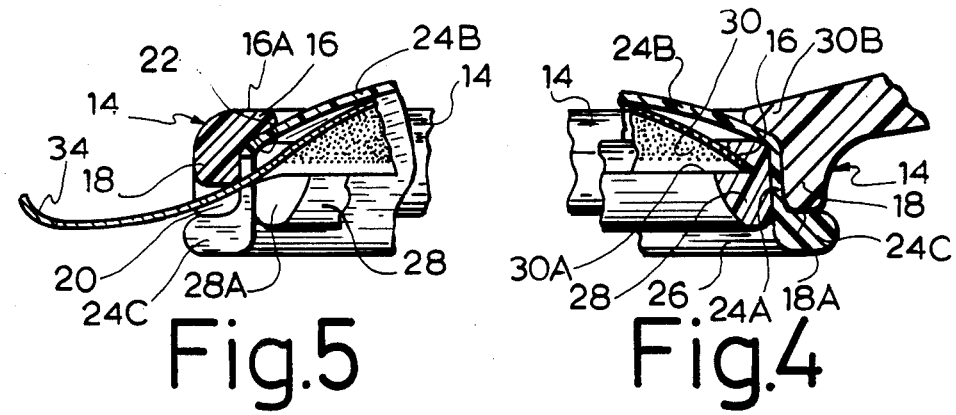

INSECT SWATTER

BACKGROUND OF THE INVENTION

Conventional fly swatters include a long stem with a semi-flexible plastic or rubber panel, at one end. Insects, especially flies, usually prefer crawling on walls or windows of a dwelling. During a strike on such insect, the swatter handle is swiftly swept in the air, so that the panel crushes the insect on the dwelling wall or window before the insect can detect the swatter, take evasive action and escape. The crushing of the insect means that the internal fluids thereof are spread on the dwelling wall, (or window) which gets dirty. This is of course undesirable.

OBJECTS OF THE INVENTION

The gist of the invention is to provide an insect swatter which will prevent an insect-supporting surface from getting soiled during a strike.

A further object of the invention is to increase the ratio of successful strikes over attempts at catching an insect with an insect swatter.

SUMMARY OF THE INVENTION

The insect swatter comprises a frame-like body, a handle secured to said body, said body having a surface striking peripheral edge and a glue-coated surface closing the inside of said body and recessed from said peripheral edge, wherein an ssinsect trapped within said body will contact and adhere to said glue without being crushed.

Preferably, said glue-coated surface is a sheet removably inserted within the body.

According to an embodiment of the invention, a rigid open frame has a surface striking edge, a handle radially outwardly connected to said frame, a flexible membrane fixedly secured by its peripheral edge to said frame in outwardly-convex fashion, protruding from said frame away from said frame edge, and a glue-coated sheet releasably lining the inside face of said membrane with the glue exposed within the open space defined by said frame, the glue adapted to be engaged by an insect to be trapped within said frame when said frame edge strikes a surface. Said membrane is forcibly movable transversely of the thickness of said frame between a first position, which is its normal rest position in which said membrane is outwardly convex, and a second insect-catching limit position in which said membrane is outwardly concave and extends short of a plane passing through said surface-striking edge of said frame; the resiliency of said membrane biasing same away from said second limit position to its normal outwardly-convex position.

BRIEF DESCRIPTION OF THE DRAWINGS

FIGS. 4 and 5 are enlargements of the areas circumscribed by circles 4 and 5, respectively, of FIG. 3;

FIG. 6 is an inverted view of FIG. 3, showing how a glued fly paper-sheet is installed within the swatter;

FIG. 7 is a perspective view of the insert swatter, at the scale of FIG. 2, showing how the used fly paper-sheet, loaded with flies, can be manually removed from the rigid frame of the swatter;

FIG. 8 is a developed bottom plan view of a waxed paper band, supporting a plurality of fly paper-sheets for the fly swatter of the invention;

DETAILED DESCRIPTION OF THE EMBODIMENTS OF THE INVENTION

Figure 1:
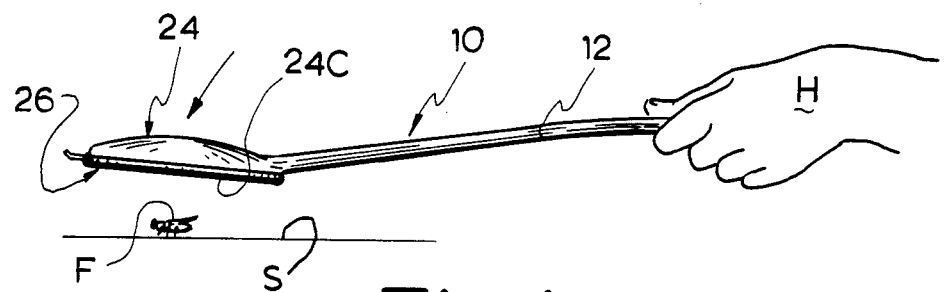
FIG. 1 is a side elevaztion of an insect swatter according to an embodiment of the invention, operated by a user's hand to catch an insect standing still over a flat rigid surface.
Figure 2:
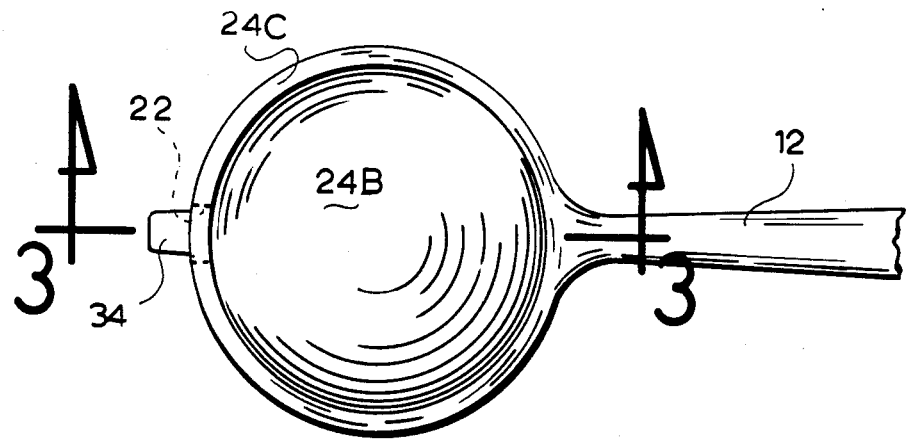
FIG. 2 is an enlarged top plan view of the insect swatter of FIG. 1, the handle thereof being partly broken.

An insect swatter according to a preferred embodiment of the invention is denoted as 10 in FIGS. 1–2. The rigid frame of swatter 10 includes a long stem or handle 12, with a ring 14 ingegrally mounted at one end thereof. In cross-section, ring 14 defines an elbow, i.e. two legs 16 and 18 making an obtuse angle therebetween of about 110 degrees FIGS. 4 and 5). The first leg 16 extends through a plane which makes a small angle of about ten degrees, with the longitudinal axis of handle 12. A section of second leg 18, in register with handle 12 and on the opposite side thereof, defines a cavity 20. Cavity 20 is of a height about half the length of leg 18 and of a width of about the width of handle 12.

Legs 16 and 18 define opposite annular edges 16A, 18A, themselves passing through two planes parallel to one another; the radially inward face of ring 14 thus defines an annular cavity 22 between the planes of these two edges. A circular semi-flexible membrane 24, made for instance of rubber, is mounted within ring 14, with the peripheral outer portion 24A thereof abutting against the seat formed by cavity 22. Membrane 24 has a main portion 24B, which is upwardly convex, so as to extend beyond the plane defined by ring edge 16A, while the peripheral edge thereof 24C (radilly outwardly of portion 24A) extends beyond the plane defined by ring edge 18A. Membrane edge 24C forms an outturned lip abutting against ring edge 18A.

Annular peripheral lip 24C of membrane 24 defines the mouth 26 of swatter 10. An annular member 28 is further provided radially inwardly of ring 14, being press-fitted against portion 24A of membrane 24, wherein the latter is securingly taken in sandwich between ring 14 and annular member 28. Annular member 28 extends short of mouth 26 and of lip 24C, and defines an intermediate radially-inward annular groove 30. Groove 30 defines a first side or seat 30A in a plane substantially parallel to mouth 26, and a second side or seat 30B making an angle of about thirty degrees with seat 30A and radially inwardly inclined toward the semi-flexible membrane main portion 24B. Annular member 28 also includes a cavity 28A, in register with cavity 20 and with a cavity made in lip 24C (FIG. 5).

A fly paper-sheet 32 of circular shape is adapted to be removably engaged in annular groove 30. Fly paper-sheet 32 is made of paper or cardboard. It includes a radially-outwardly-protruding tongue 34, adapted to extend through cavities 20, 28A. Fly paper-sheet 32 defines a main face coated with glue 32A of the same type as used in conventional fly paper strips hung from a ceiling. Tongue 34 is not coated with glue 32A.

As shown in FIG. 8, each fly paper 32 is advantageously stored before use by flatly abutting against a supporting wax or silicone-coated, release paper-sheet 36, which is of greater size than fly paper 32. Each release sheet 36 is substantially quadrangular, but with one slanted edge 36A; tab 34 is so positioned as to extend beyond slanted edge 36A. The small remaining edge 36B of release sheet 36 adjacent slanted edge 36A is connected to an edge of another release sheet 36 via a weakened section 38, section 38 constituting a tear-line for separating two adjacent individual release sheets 36. Several sheets 36 form a band 37 which can be rolled into a package or roll.

To install the fly paper-sheet 32 within the swatter 10, a release sheet 36 is teared along tear-line 38 from the band 37. That release sheet 36 is pushed by the user's hand H through mouth 26, as suggested in FIG. 6, with fly paper 32 first, and the peripheral edge of the latter is pushed against bevelled seat 30B into groove 30, thus causing flexing and biasing of fly paper 32 against membrane main portion 24B. This operation causes initial peeling of release sheet 36 off fly paper-sheet 32, since release sheet 36 rests against lip 24c. The user then completes the peeling off operation by pulling on protruding tongue 34 of release sheet 36. The fly paper 32 will remain within groove 30, since the peripheral edge thereof abuts against radial seat 30A which is substantially orthogonal to the direction of retraction of the release sheet 36 during peeling thereof. The main portion of fly paper sheet 32 is biased against membrane portion 24B, because of the inclination of seat 30B.

Figure 3:
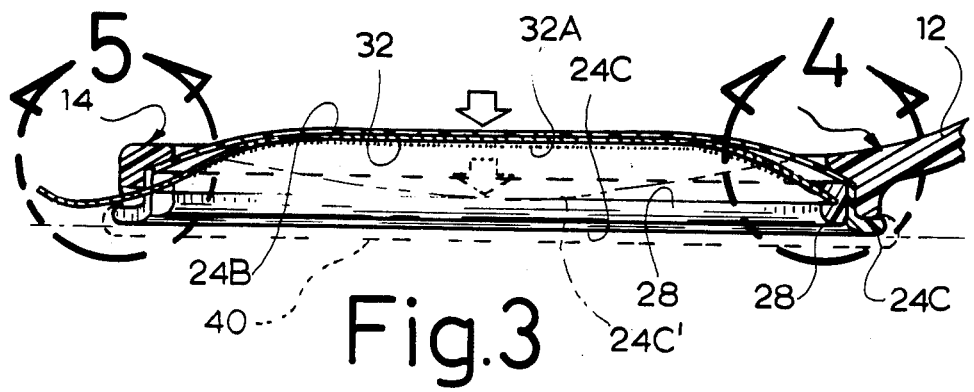
FIG. 3 is an enlarged longitudinal sectional view of the swatter taken along line 3—3 of FIG. 2.

FIGS. 1 and 3 best show how a fly F can be caught by the fly swatter 10. The user pivots handle 12 with his hand H, in a swift movement, so as to bring the swatter mouth edge 24C flatly against the flat rigid surface S of a dwelling, such as a wall or a window, and around the fly F standing on such surface. Because of the required swiftness of the movement of ring 14, a relatively high level of inertia momentum is gained by semi-rigid membrane 24; upon mouth edge 24C striking surface S, a counter reaction will cause main portion 24B of membrane 24 and fly paper-sheet 32 to briefly become concave, as shown at 24C', the center portion of fly paper-sheet 32 is short of lip 24C and, therefore, remain spaced from underlying rigid surface S. but rather, bug F comes in contact with and adheres to glue 32A. Surface S remains therefore clean.

Depending on the relative position of the insert F, its dimensions, and the level of inertia momentum gained by flexible wall 24, fly paper-sheet 32 could stop short of the bug F in its concave position. Nevertheless, if bug F is a flying insect, upon being trapped, it will start to fly and will adhere to glue 32A. If bug F is a non-flying or crawling insect, such as a cockroach, the swatter can be made, so that the minimum distance of the glue coating from the stricken surface is just sufficient to touch the insect without crushing the same. Such a distance is about 3/16" for cockroaches. When fly paper-sheet 32 is spent, it can be easily removed by pulling on tab 34, as shown in FIG. 7, and replaced by a fresh sheet 32, as previously described in connection with FIGS. 6 and 8.

Portion 24B and fly paper-sheet 32 could be perforated by a number of small holes (not shown), for lesser air resistance of the swatter 10 and for reducing air pressure increase therein.

The swatter can be made in a one-piece molded construction with means to releasably retain a glue-coated sheet therein.

For instance, part 24B could be dispensed with and sheet 32 exposed at the top of the swatter, while annular member 28 and ring 14 are made in one piece together with parts 24A, 24C. The shape of the shape of the resulting body could be other than shown.

In order to muff the noise produced by an insect just caught in the fly-paper sheet 32, a cover 40 can be snap fitted around lip 24C, as shown in dotted lines in FIG. 3.

What I claim is:

1. An insect swatter comprising a frame-like body, a handle secured to said body, said body having a surface-striking peripheral edge, and a membrane closing the inside of said body and recessed from said surface-striking edge, a glue layer lining the face of said membrane facing said surface-striking edge, wherein said membrane is forcibly movable transversely of the thickness of said frame between a first position, which is its normal rest position, in which said membrane is outwardly convex, and a second insect-catching limit position in which said membrane is outwardly concave and extends short of a plane passing through said surface-striking edge, whereby an insect trapped within said body will contact and adhere to said glue layer without being crushed.

2. The insect swatter of claim 1, wherein said glue layer is on a sheet removably inserted within the body.

3. An insect swatter as in claim 1, further including a cover releasably fitted to said surface-striking edge to hamper the noise produce by an insect adhering to said glue layer.

4. An insect swatter comprising a rigid open frame having a surface-striking edge, a handle radially outwardly connected to said frame, a flexible membrane fixedly secured by its peripheral edge to said frame in outwardly-convex fashion, protruding from said frame away from said surface-striking edge, and a glue-coated sheet releasably lining the inside face of said membrane with the glue exposed within the open space defined by said frame, the glue adapted to be engaged by an insect to be trapped within said frame, when said frame edge strikes a surface, wherein said membrane is forcibly movable transversely of the thickness of said frame between a first position, which is its normal rest position, in which said membrane is outwardly convex, and a second insect-catching limit position in which said membrane is outwardly concave and extends short of a plane passing through said surface-striking edge of said frame; the resiliency of said membrane biasing same away from said second limit position to its normal outwardly-convex position.

5. An insect swatter as in claim 4, wherein said frame has a recess in its surface-striking edge, and further including a tongue, radially protruding from a peripheral section of said glue-coated sheet and extending through said recess, whereby pulling said tongue dislodges said glue-coated sheet from said frame.

6. An insect swatter as in claim 4, wherein said frame is a ring which is cross-sectionally elbowed; further including an annular member, mounted radially inwardly of said ring into the elbow thereof, the peripheral edge of said membrane being sandwiched between said annular member and said ring; said annular member defining a radially-inward groove frictionally engageable by the peripheral edge of said glue-coated sheet.

7. An insect swatter as in claim 6, wherein said annular member groove is cross-sectionally V-shape.

8. An insect swatter as in claim 7, wherein said cross-sectionally V-shaped groove includes one side extending through a virtual plane substantially parallel to the plane of said ring, said one side defining a seat against which said glue-coated sheet peripheral edge abuts.

9. An insect swatter as in claim 4, wherein said cross-sectionally V-shaped groove includes another side, which is radially inwardly inclined in a direction away from the plane of said surface-striking edge.

10. An insect swatter as in claim 4, wherein said glue-coated sheet, before use, adheres to a release backing sheet of greater size than said glue-coated sheet, so that the latter can be inserted in said body by pushing on said backing sheet, which rests on said surface-striking edge to initiate peeling of said backing sheet off said glue-coated sheet.

* * * * *